Patented Apr. 18, 1939

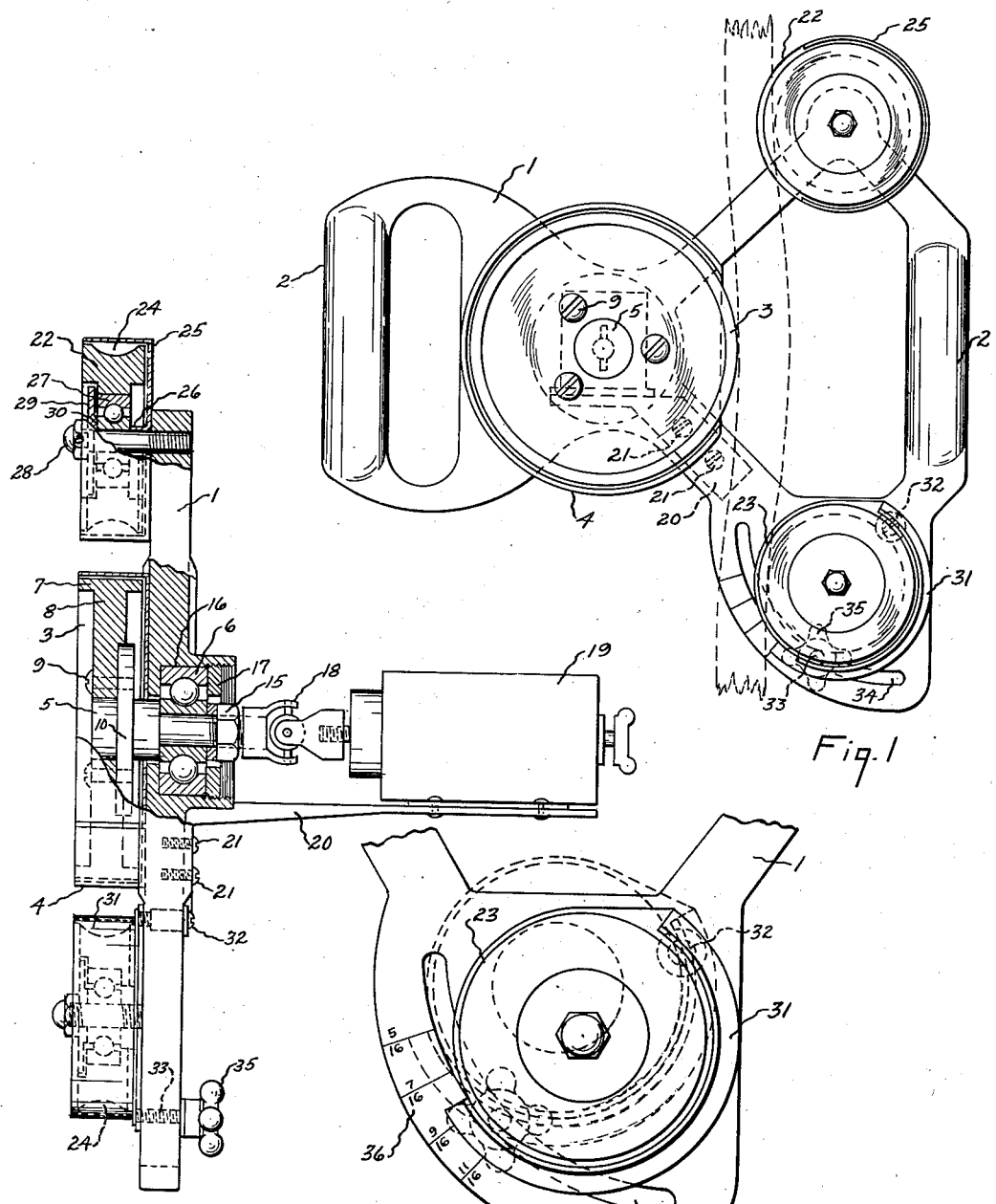

2,154,621

UNITED STATES PATENT OFFICE 2,154,621

MEASURING INSTRUMENT

Charles R. Jenkins, Parma, Mich.

Application December 6, 1935, Serial No. 53,166

9 Claims. (Cl. 33—134)

This invention relates to measuring instruments for measuring cables, ropes, and the like, and particularly to such instruments for measuring cables, ropes, and the like, under tension due to their own weight or to a load carried thereby.

The invention has particular reference to an instrument for measuring the depth of oil wells for instance, by measuring the length of the cable carrying the bailer as it is lowered into the ground. However, it is equally applicable to the measurement of the length of any cable, rope, or the like, under tension.

The invention comprises a measuring roller with which the cable, rope, or the like, is made to engage. In order to prevent slipping between the cable, rope, or the like, and the measuring roller, the cable is deflected slightly laterally by a pair of rollers, one on either side of the axis of the measuring roller, urging the cable, rope, or the like, toward the measuring roller thus providing a three point engagement.

An object of this invention is to provide an instrument for measuring the length of a cable, rope, or the like by placing it in running engagement with the cable.

Another object of this invention is to provide a measuring instrument having a measuring roller against which a cable, rope, or the like, is laterally deflected.

A further object of this invention is to provide a measuring instrument for cables, ropes, or the like, wherein adjustable means are provided for laterally deflecting a cable, rope, or the like, about a measuring roller.

A still further object of this invention is to provide a novel method of measuring a cable, rope, or the like.

These and other objects will be apparent from the following specification when taken with the accompanying drawing in which:

Fig. 1 is a side elevation disclosing the measuring instrument having a cable inserted therein, Fig. 2 is an end elevation of the instrument having parts broken away to show vertical sections, and Fig. 3 is an enlarged view disclosing the adjustable one of the two lateral deflecting rollers.

Referring particularly to Fig. 1 the instrument has a cast frame 1 preferably of aluminum or other light weight alloy. The frame 1 is provided with two handles 2 by which the instrument is held during measuring. A measuring roller 3 disposed within a housing 4 integral with the frame 1 is mounted on a spindle 5 journaled in a suitable bearing 6. The roller 3 has a widened outer rim 7 on which is deposited a layer of hardened wear resisting alloy, and a central web 8 secured by screws 9 to the flange 10 comprising a portion of the spindle 5. The spindle 5 is clamped against the inner race of the bearing 6 by a nut 15 and the bearing 6 is maintained in a recess 16 in the frame 1 by a nut 17. A portion of the housing 4 is cut away as shown particularly in Fig. 1 to expose a portion of the measuring roller 3 so that it may be contacted by the cable, rope, or the like, to be measured. The spindle 5, to which the roller 3 is secured by the screws 9, drives, through a universal joint 18, a suitable revolution counter 19, the revolution counter 19 being mounted in alignment with the spindle 5 on a bracket 20 secured by screws 21 to the frame 1.

In order to increase the area of contact of the cable, rope, or the like on measuring roller 3, the cable, rope, or the like, is deflected laterally toward the measuring roller 3 by spaced rollers 22 and 23 each provided with peripheral grooves 24, the rollers 22 and 23 being disposed above and below the axis of the measuring roller 3 so that the cable, rope, or the like, is engaged by a three point contact. The roller 22 is provided with a housing 25 rigidly secured to the frame 1, the housing having a portion thereof cut away to expose a portion of the roller 22 to the cable, rope, or the like, being measured. The interior of the housing 25 is provided with a boss 26 to which the inner race of a bearing 27 is clamped by a screw 28 threaded into the frame 1, bearing against a washer 29 having a boss 30, the wheel 22 being mounted by press fitting it around the outer race of the bearing 27.

The roller 23 is disposed within a housing 31, the mounting of the roller 23 being the same as that of the roller 22. However, the housing 31 is pivotally mounted on the frame 1 by the screw 32, secured to the base of the housing 31 at one edge thereof. It should be observed that the rollers 22 and 23 and the measuring roller 3 are all on the same side of the frame 1 and in the same plane. The opposite edge of the housing 31 has attached thereto a threaded pin 33 extending through an arcuate slot 34 in the frame 1, the arcuate slot having the pivotal point of the housing 31 as its center of curvature. On the opposite side of the frame 1 from the housing 31 there is threaded to the pin 33 a hand nut 35 for clamping the housing 31 and consequently the roller 23 in adjusted position.

In order to measure a cable, rope, or the like, by using the present invention the measuring device is moved laterally to dispose the cable, rope, or the like, between the measuring roller 3 and the deflecting rollers 22 and 23 in the manner shown in Fig. 1. The measuring device is then moved relatively to the cable, rope, or the like. Generally this relative movement is accomplished by holding the measuring device still and moving the cable, rope, or the like, through it. In order to provide the correct lateral deflection in the cable, rope, or the like, to obtain the necessary frictional engagement with the measuring roller 3 the deflecting roller 23 is pivoted about the screw 32. Calibrations 36 are provided on the lower edge of the frame 1 as shown particularly in Fig. 3 for the standard cable, rope, or the like, sizes indicating the predetermined position to which the roller 23 must be pivoted in order to obtain the proper lateral deflection.

A convenient size of measuring roller is such that a complete revolution will correspond to a cable, rope, or the like, length of one foot so that the reading on the revolution counter 19 will give the length of the cable, rope, or the like, directly in feet. The circumference of the measuring roller, in such a case, will be somewhat less than one foot for the reason that when the cable, rope, or the like, is laterally deflected toward the measuring roller 3, the true length of the cable, rope, or the like, is the length of a line through the center thereof. Therefore as the measuring roller measures the inside of the curved portion of the cable, rope, or the like, which is of less length than a line through the center, the measuring roller must have a circumference of less than one foot to measure one foot per revolution. It is for the reason that the position of the roller 23 must be predetermined according to the diameter of the cable so that the correct cable, rope, or the like, deflection is obtained.

It will be obvious from the foregoing that the necessary deflection of the cable may be produced by moving any one of the rollers relatively to the other two.

Having thus described my invention what I desire to secure by Letters Patent and claim is:

1. A device of the character described for measuring the length of flexible elements such as cables, ropes, or the like, comprising a frame, means presenting an endless surface movable past a predetermined point, means, relatively bodily movable with respect to said first named means, for urging the flexible element to be measured, while moving and under tension, into contact with said endless surface to deflect said flexible element a predetermined amount to drive said first named means, means to indicate the relative position to which said urging means should be moved to deflect the flexible element being measured an amount depending on the diameter thereof, and means operated by said first named means for indicating the length of the center line of the flexible element passed by said first named means.

2. A device of the character described for measuring the length of flexible elements such as cables, ropes, or the like, comprising a frame, a measuring roller rotatably mounted thereon arranged to be driven by the flexible element to be measured for measuring the length of the center line of said flexible element, a pair of deflecting rollers for deflecting the flexible element, while moving and under tension, into contacting engagement with the periphery of said measuring roller, at least one of said rollers being bodily movable with respect to said measuring roller, and means to indicate the relative position to which said urging means should be moved to deflect the flexible element being measured an amount depending on the diameter thereof.

3. A device of the character described for measuring the length of flexible elements such as cables, ropes, or the like, comprising a frame, a measuring roller rotatably mounted thereon arranged to be driven by the flexible element to be measured, a pair of deflecting rollers mounted on said frame for deflecting the flexible element, while moving and under tension, into contacting engagement with the periphery of said measuring roller, means for adjusting one of said rollers for the purpose of regulating the deflection of the flexible element, and means for indicating the adjustment to be made depending on the diameter of the element to be measured.

4. A device of the character described for measuring the length of flexible elements such as cables, ropes, or the like, comprising a frame, a measuring roller rotatably mounted thereon arranged to be driven by the flexible element to be measured, a pair of deflecting rollers mounted on said frame for deflecting the flexible element, while moving and under tension, into contacting engagement with the periphery of said measuring roller, means for moving one of said deflecting rollers about a predetermined point for the purpose of regulating the deflection of the flexible element, and means for indicating the adjustment to be made depending on the diameter of the element to be measured.

5. A device of the character described for measuring the length of flexible elements such as cables, ropes, or the like, comprising a frame, a measuring roller rotatably mounted thereon arranged to be driven by the flexible element to be measured, a pair of deflecting rollers mounted on said frame for deflecting the flexible element into contacting engagement with the periphery of said measuring roller, means for moving one of said deflecting rollers about a predetermined point for the purpose of regulating the deflection of the flexible element, means for indicating the adjustment to be made depending on the diameter of the element to be measured, and means operated by said roller for indicating the length of the flexible element passed between said measuring roller and said deflecting rollers.

6. A device of the character described for measuring the length of flexible elements such as cables, ropes, or the like, comprising a frame, a measuring roller rotatably mounted thereon arranged to be driven by the flexible element to be measured, a pair of deflecting rollers mounted on said frame for deflecting the flexible element into contacting engagement with the periphery of the measuring roller, one of said deflecting rollers being mounted for bodily oscillation about a predetermined point for the purpose of regulating the deflection of the flexible element, and means for locking said roller in adjusted position.

7. A device of the character described for measuring the length of flexible elements such as cables, ropes, or the like, comprising a frame, a measuring roller rotatably mounted thereon arranged to be driven by the flexible element to be measured, a pair of deflecting rollers mounted on said frame for deflecting the flexible element into contacting engagement with the periphery of the measuring roller, one of said deflecting rollers being mounted for bodily oscillation about a predetermined point for the purpose of regulating the deflection of the flexible element, means to indicate the correct adjusted position of said adjustable roller according to the size of the flexible element being measured, and means to lock said adjustable roller in adjusted position.

8. A device of the character described for measuring the length of flexible elements such as cables, ropes, or the like, comprising a frame, a measuring roller rotatably mounted thereon arranged to be driven by the flexible element to be measured, a pair of deflecting rollers mounted on said frame for deflecting the flexible element, while moving and under tension, into contacting engagement with the periphery of said measuring roller, one of said deflecting rollers being mounted for bodily oscillation about a predetermined point for the purpose of regulating the deflection of the flexible element, a slot defined by said frame, and means movable with said roller and in said slot for locking said roller in adjusted position.

9. A device of the character described for measuring the length of flexible elements such as cables, ropes or the like, comprising a frame, a measuring roller rotatably mounted thereon arranged to be driven by the flexible element to be measured, a pair of deflecting rollers, one of said rollers being mounted on said frame and being rigidly fixed wtih respect to said measuring roller, the other of said pair of deflecting rollers being anchored to said frame but adjustable with respect to said measuring roller, the space relation between said measuring roller and said other deflecting roller being varied according to the diameter of said flexible element during measuring operation.

CHARLES R. JENKINS.